(12) United States Patent
Vortmeyer

(10) Patent No.: US 7,651,106 B2
(45) Date of Patent: Jan. 26, 2010

(54) WHEEL-GUIDING STABILIZER DEVICE

(75) Inventor: Jens Vortmeyer, Preussisch Oldendorf (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 12/279,892

(22) PCT Filed: Feb. 28, 2007

(86) PCT No.: PCT/DE2007/000371

§ 371 (c)(1),
(2), (4) Date: Aug. 19, 2008

(87) PCT Pub. No.: WO2007/112714

PCT Pub. Date: Oct. 11, 2007

(65) Prior Publication Data

US 2009/0033056 A1    Feb. 5, 2009

(30) Foreign Application Priority Data

Mar. 30, 2006   (DE) .................. 10 2006 015 168

(51) Int. Cl.
*B60G 21/055*   (2006.01)
(52) U.S. Cl. ............................................. 280/124.106
(58) Field of Classification Search .......... 280/124.106, 280/124.149, 124.152, 124.153, 5.502, 5.508, 280/5.511, 5.515

See application file for complete search history.

(56) References Cited

U.S. PATENT DOCUMENTS

| 2,768,001 | A | | 10/1956 | Muller |
| 3,195,670 | A | * | 7/1965 | Dunn ........................ 180/359 |
| 3,371,940 | A | | 3/1968 | Sinclair et al. |
| 3,692,295 | A | | 9/1972 | Cass et al. |
| 4,249,753 | A | * | 2/1981 | Froumajou .................. 280/790 |
| 4,360,221 | A | | 11/1982 | Wagner |
| 4,473,238 | A | | 9/1984 | Antoine |
| 5,076,605 | A | * | 12/1991 | Umeda ................. 280/124.107 |
| 5,549,320 | A | | 8/1996 | Ellingsen |
| 5,882,017 | A | * | 3/1999 | Carleer .................... 280/5.508 |

(Continued)

FOREIGN PATENT DOCUMENTS

DE        907149       2/1954

(Continued)

*Primary Examiner*—Paul N Dickson
*Assistant Examiner*—Robert A Coker
(74) *Attorney, Agent, or Firm*—McGlew and Tuttle, P.C.

(57) ABSTRACT

A stabilizer device for an axle of a motor vehicle. The axle has a roll stabilizer (2) and for each wheel at least one wheel guide control arm (1). The chassis-side articulation of the wheel guide control arm (1) is connected to an end area of the roll stabilizer (2) such that a twisting actuation of the roll stabilizer (2) takes place due to an inward deflection motion of the wheel guide control arm (1). An end of the roll stabilizer (2) is received in a hollow shaft (6) connected to the wheel guide control arm (1). The hollow shaft (6) is mounted in a chassis-side bearing flange (3) and the bearing flange (3) can be elastically connected to the vehicle. The stabilizer device is used especially to eliminate the conflicts of design goals between the requirements of uncoupling structure-borne noise and comfort of the chassis, on the one hand, and immediate response characteristic of the stabilizer, on the other hand. Further advantages include space required for installation, weight and modularity of the stabilizer device.

20 Claims, 2 Drawing Sheets

U.S. PATENT DOCUMENTS

| | | | |
|---|---|---|---|
| 5,934,696 A * | 8/1999 | Bloser et al. | 280/124.106 |
| 6,161,843 A * | 12/2000 | Carleer | 280/5.508 |
| 7,270,336 B2 * | 9/2007 | Fujimori | 280/5.511 |

FOREIGN PATENT DOCUMENTS

| | | |
|---|---|---|
| DE | 1072893 | 1/1960 |
| DE | 3737735 | 6/1988 |
| DE | 4021157 | 2/1991 |
| DE | 4322326 | 1/1995 |
| DE | 29521157 | 10/1996 |
| DE | 19846275 | 12/1999 |
| DE | 19903435 | 8/2000 |
| DE | 10348656 | 5/2004 |
| DE | 10304486 | 8/2004 |
| DE | 102004020073 | 11/2005 |
| EP | 0048956 | 4/1982 |
| EP | 0094373 | 11/1983 |
| EP | 0649764 | 4/1995 |
| EP | 1564041 | 8/2005 |
| FR | 2053490 | 4/1971 |
| FR | 2564785 | 11/1985 |
| FR | 2608517 | 6/1988 |

* cited by examiner

WHEEL-GUIDING STABILIZER DEVICE

CROSS REFERENCE TO RELATED APPLICATIONS

This application is a United States National Phase application of International Application PCT/DE 2007/000371 and claims the benefit of priority under 35 U.S.C. § 119 of German Patent Application DE 10 2006 015 168.2 filed Mar. 30, 2006, the entire contents of which are incorporated herein by reference.

FIELD OF THE INVENTION

The present invention pertains to a stabilizer device for a vehicle axle with roll stabilizer for an axle of a motor vehicle wherein the axle has a roll stabilizer as well as at least one wheel guide control arm for each wheel.

BACKGROUND OF THE INVENTION

Vehicle axles of this type, in which the roll stabilizer is actuated directly by a wheel guide control arm, for example, by a tension rod or strut of the wheel suspension, are advantageous because it is possible in this manner to achieve especially a stabilizer transmission ratio of 1:1. In other words, this means that the inward deflection motions of the wheel are converted into a corresponding torsional motion of the stabilizer not only proportionally but to the full extent, and it is therefore possible to use, for example, correspondingly thinner or thinner-walled and hence lighterweight stabilizers. Furthermore, the mounting of the stabilizer can thus be made more flexible and hence more comfortable without worsening of the response characteristic.

Moreover, both the usual articulations of the stabilizer ends via a separate rocker pendulum with two ball and socket joints and the usual bent stabilizer legs are eliminated with this design, as a result of which weight is likewise reduced and a considerable amount of valuable space is made additionally available for installation.

However, considerable conflicts of goals in terms of design occur in the area of the connection between the chassis-side end of the wheel guide control arm and the respective associated end of the stabilizer in wheel-guiding stabilizer device of this type, as they are known, for example, from DE 10 2004 020 073 A1 or from EP 1 564 041 A2, because it is precisely in this area that conflicting design requirements of the otherwise separate components "wheel guide control arm" and "tension rod/strut" and "roll stabilizer", which a stabilizer of this type continues to have to meet, clash with one another.

The functions and requirements that are relevant here include especially the most direct possible conversion of the inward deflection motions of the wheel into corresponding rotary motions of the stabilizer, and, furthermore, the power transmission from the wheel carrier to the chassis or to the axle carrier, as well as the specifically required flexibility and vibration damping on the path between the wheel carrier and the axle carrier or chassis.

The problem arising when the stabilizer and the wheel guide control arm are united in the wheel-guiding stabilizer device of this type is especially that even though soft rubber bearings and correspondingly high flexibilities in the area of the chassis-side connection of the wheel guide control arm to the axle carrier are advantageous for comfort mounting with good acoustic damping, they have at the same time a disadvantageous effect on the response characteristic of the stabilizer. To make matters worse concerning the coupling of the wheel guide control arm with the stabilizer end, the axis of rotation of the stabilizer extends in the transverse direction of the vehicle, whereas the axes of rotation of wheel guide control arms, especially the axes of rotation of the tension rods or struts that can be considered, extend, in general, at an acute angle to the longitudinal axis of the vehicle.

The connection area between the stabilizer end, the chassis-side end of the wheel guide control arm and the chassis or axle carrier must consequently guarantee, as much as possible, a defined, soft and vibration-damping introduction of the forces of the wheels into the chassis, but it must guarantee, furthermore, a possibly undamped, direct conversion of the inward deflection of the wheel into the twisting of the stabilizer, and at the same time it also must permit the angular changes occurring during the inward deflection between the longitudinal axis of the wheel guide control arm and the axis of rotation of the stabilizer.

SUMMARY OF THE INVENTION

Against this background, the object of the present invention is to provide a wheel-guiding stabilizer device, with which the drawbacks present in the state of the art are overcome. The stabilizer device shall lead, in particular, to advantages concerning the comfort properties, acoustics and the uncoupling of the chassis from structure-borne noise along with immediate response of the stabilizer at the same time. Furthermore, improvements shall be achieved in terms of the space needed for the installation of the stabilizer device, concerning the reduction of weight as well as concerning improved modularity in connection with the use in wheel suspensions and axle systems.

In a manner that is known in itself, the stabilizer device according to the present invention is intended for use on a vehicle axle with a roll stabilizer, wherein the axle has at least one wheel guide control arm for each wheel. In a manner that is likewise known in itself, the chassis-side articulation of the wheel guide control arm is connected to the corresponding end area of the roll stabilizer such that a twisting actuation of the roll stabilizer takes place due to inward deflection motions of the wheel guide control arm.

However, the stabilizer device is characterized according to the present invention in that the roll stabilizer is mounted on the end side in an at least partially hollow shaft, which is connected to the wheel guide control arm. This hollow shaft is mounted in a chassis-side bearing flange. and the bearing flange can be elastically connected to the vehicle, for example, to an axle carrier of the vehicle.

The mounting of the stabilizer ends in a hollow shaft mounted elastically on the chassis side is advantageous because no right-angle bending of the stabilizer is necessary any longer in this manner, especially not in the area of its ends. The ends of the stabilizer can rather be designed with a straight shape in the manner of a rod thanks to the hollow shaft, which assumes the task of connecting the stabilizer end to the vehicle-side end of the wheel guide control arm according to the present invention, as a result of which the stabilizer device according to the present invention is suitable especially, but by no means exclusively, for the tubular stabilizers, which are very lightweight but have a demanding design.

In addition, thanks to the hollow shaft, the entire length of the stabilizer or the entire width of the stabilizer device can be fully utilized as an effective stabilizer twisting length, which is desirable from a design point of view. Furthermore, an especially compact arrangement of the mount of the hollow shaft as well as of the connection between the stabilizer end and the wheel guide control arm is obtained on the whole.

Thanks to the bearing flange, optimal uncoupling of the entire module comprising the stabilizer, the hollow shaft and the wheel guide control arm in respect to vibrations and sound transmission can be achieved, furthermore, in relation to the vehicle chassis, but the wheel guide control arm acts at the same time non-elastically on the hollow shaft and on the stabilizer and thus ensures an immediate response of the stabilizer in case of inward deflection motions of the wheel.

Finally, other advantages are achieved as well, which concern especially simple manufacturability and uncomplicated mounting of the entire stabilizer device as an axle part module on the vehicle.

The present invention is embodied independently from the design of the elastic connection of the bearing flange to the vehicle chassis or axle carrier. However, according to a preferred embodiment, the elastic connection of the bearing flange has a spring rate in the z direction (i.e., along the vertical axis of the vehicle) that is at least twice the spring rate in the x direction (longitudinal axis of the vehicle) or in the y direction (transverse axis of the vehicle). Good comfort properties can be achieved in this manner concerning the undesired sound and vibration transmission taking place along the longitudinal axis of the wheel guide control arm, immediate response of the stabilizer is also guaranteed at the same time because of the high spring rate in the z direction.

The elastic connection of the bearing flange to the axle carrier or to the vehicle chassis is preferably brought about by means of elastomer bearings or hydraulic bearings, which have proved to be highly successful for the purpose of vibration damping and sound absorption in vehicles.

According to an especially preferred embodiment of the present invention, the elastomer bearings or hydraulic bearings are arranged point-symmetrically in relation to the intersection of the longitudinal axes of the wheel guide control arm and the hollow shaft. An optimally uniform introduction and distribution of the radial forces from the wheel guide control arm into or onto the individual support points is achieved in this manner. Since the support points are arranged point-symmetrically according to this embodiment in relation to the effective force introduction point, which is located at the intersection of the longitudinal axes of the wheel guide control arm and the hollow shaft or stabilizer, no secondary torques are generated, and consequently no undesired tilting of the bearing flange in relation to the chassis or in relation to the axle carrier will take place at the time of the introduction of the force, either.

The present invention can be embodied independently from the particular shape of the roll stabilizer, as long as the end areas of the stabilizer can be accommodated in the hollow shaft. According to an especially preferred embodiment, the roll stabilizer is formed, however, essentially by a straight rod or by a straight tube. This leads to an especially cost-effective manufacture and to the lowest possible weight as well as to an optimal utilization of material, because the entire length of the stabilizer is subject to a completely uniform torsional load in this manner. Furthermore, the design of the stabilizer device can thus be managed especially accurately, and, moreover, the stabilizer device can be mounted on the modular unit in a simple manner.

Provisions are made in another embodiment of the present invention for the roll stabilizer to comprise two separate stabilizer halves. An actuator for the active relative rotation of the stabilizer halves against each other can now be arranged between the stabilizer halves. Controlling torques or adjusting forces can be generated in this manner between the wheel suspension and the vehicle body or introduced into the wheel suspension in the sense of the active chassis. For example, active roll stabilization of the vehicle can thus take place during travel in a curve, or the effective rigidity of the roll stabilizer can be varied as a function of the driving condition of the vehicle.

The term "stabilizer halves," which was selected for reasons of clarity, shall not, however, be interpreted as being limited to the extent that the two stabilizer halves must compulsorily have an equal length, because the stabilizer halves may just as well have different lengths, without the effectiveness or overall characteristic of such an active roll stabilizer changing as a result.

Furthermore, it is at first irrelevant for the embodiment of the present invention how the vehicle-side end of the wheel guide control arm and the hollow shaft are coupled with one another, as long as reliable torque transmission is guaranteed while the angle between the longitudinal axis of the wheel guide control arm and the axis of rotation of the hollow shaft is variable at the same time.

However, according to a preferred embodiment of the present invention, the wheel guide control arm is connected to the hollow shaft by means of two ball and socket joints. This is advantageous because a clearance-free transmission of motions between the wheel guide control arm and the hollow shaft or between the wheel guide control arm and the roll stabilizer by means of the ball head technique, which proved to be successful in wheel suspensions, can take place as a result. At the same time, the degree of freedom of the pivoting motion between the wheel guide control arm and the hollow shaft, which degree of freedom is necessary during inward deflection and steering motions, is made possible and smooth running is possible. Furthermore, such a connection between the wheel guide control arm and the hollow shaft is largely maintenance-free along with a long service life and can be easily managed in terms of design.

The centers of the balls of the ball and socket joints are especially preferably arranged on a straight line passing through the diameter of the hollow shaft. Optimal introduction of torques is achieved in this manner while the ball and socket joints are subject to the lowest load possible and the lever arm between the ball and socket joints and the hollow shaft is at the same time optimal.

According to another, likewise preferred embodiment of the present invention, the joint housings of the ball and socket joints are formed by the wheel guide control arm itself. This embodiment can be obtained especially in the form of a one-piece, fork-like design of the vehicle-side end area of the wheel guide control arm, and the joint housings of the ball and socket joints are formed by corresponding holes in the two fork ends of the wheel guide control arm, or are received by these holes. An advantageous, cost-saving combination of functions is achieved in this manner while the rigidity is high and the space required for installation is small at the same time.

The manner of mounting the hollow shaft in the bearing flange can be selected according to the present invention as desired as long as the wheel forces occurring can be reliably transmitted from the wheel guide control arm to the bearing carrier via the hollow shaft. However, according to a preferred embodiment of the present invention, the hollow shaft is mounted in the bearing flange by means of a fixed and loose bearing. Smooth running and absence of stresses on the bearing can be guaranteed in this manner under all temperature and load conditions, and, moreover, a long service life, which can be exactly managed in terms of design, can be achieved by a suitable design.

The fixed bearing of the hollow shaft is preferably formed now by a sleeve joint. Sleeve joints are inexpensive and have been used successfully in the area of the axle systems of motor vehicles. They are characterized by high load-bearing capacity, low maintenance requirement, compact design, and especially by problem-free absorption of angle errors or deflection of the shaft.

According to another, especially preferred embodiment of the present invention, the wheel guide control arm connected to the roll stabilizer is a tension rod or strut of a wheel suspension. Tension rods and struts of wheel suspensions are especially well suited for actuating stabilizers because of the acute angle between the longitudinal axis of the strut or rod and the direction of travel, because a nearly 1:1 transmission ratio can thus be attained between the angular motion of the tension rod or strut, which is due to the inward deflection, and the corresponding torsion of the roll stabilizer.

The present invention will be explained in more detail below on the basis of drawings, which show exemplary embodiments only. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
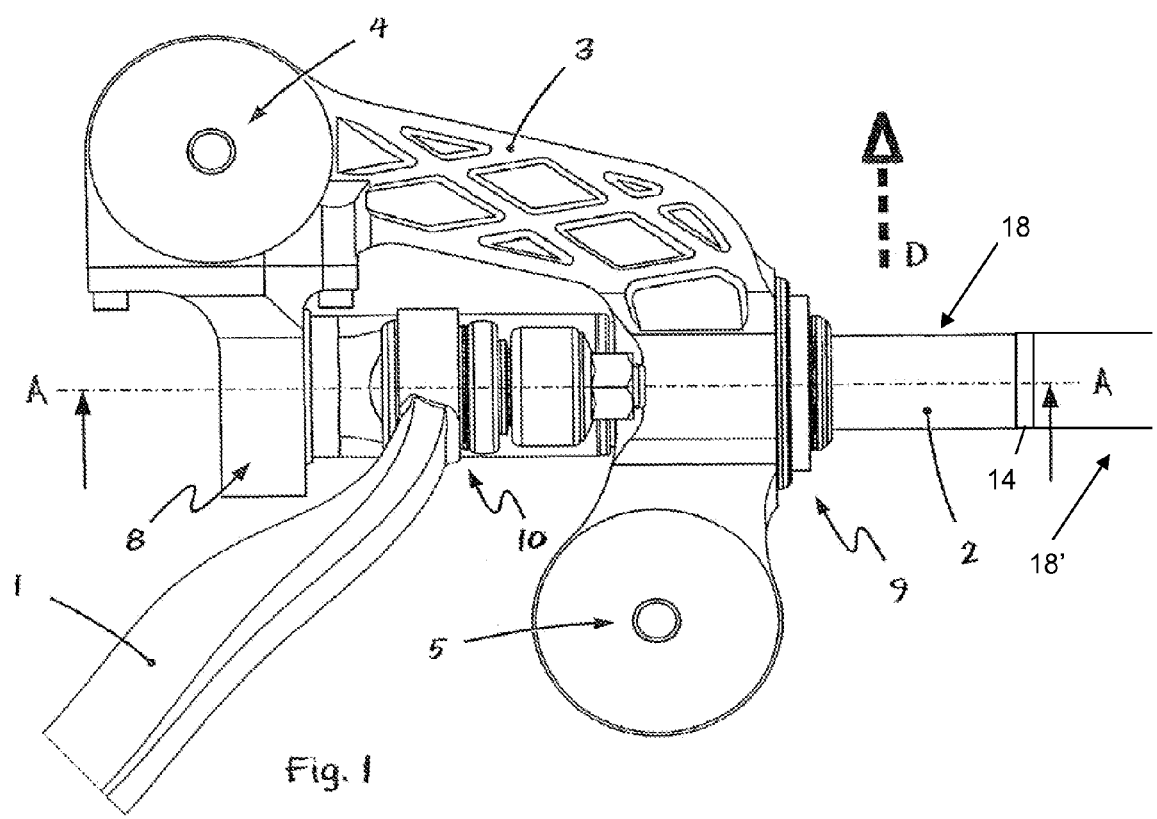
FIG. 1 is a schematic top view of the connection between the wheel guide control arm and the stabilizer end in an embodiment of a stabilizer device according to the present invention.

Referring to the drawings in particular, FIG. 1 shows the connection between a wheel guide control arm 1 of an axle 20 (FIG. 2) and the corresponding stabilizer end 2 in an embodiment of a stabilizer device according to the present invention in a top view. FIG. 1 shows the stabilizer end 2 that is the left-side end relative to the direction of travel as well as the chassis-side end area of the corresponding wheel guide control arm 1. The direction of travel of the vehicle in question extends upwardly relative to the drawing, as it is indicated by the arrow D drawn in broken line.

Figure 3:
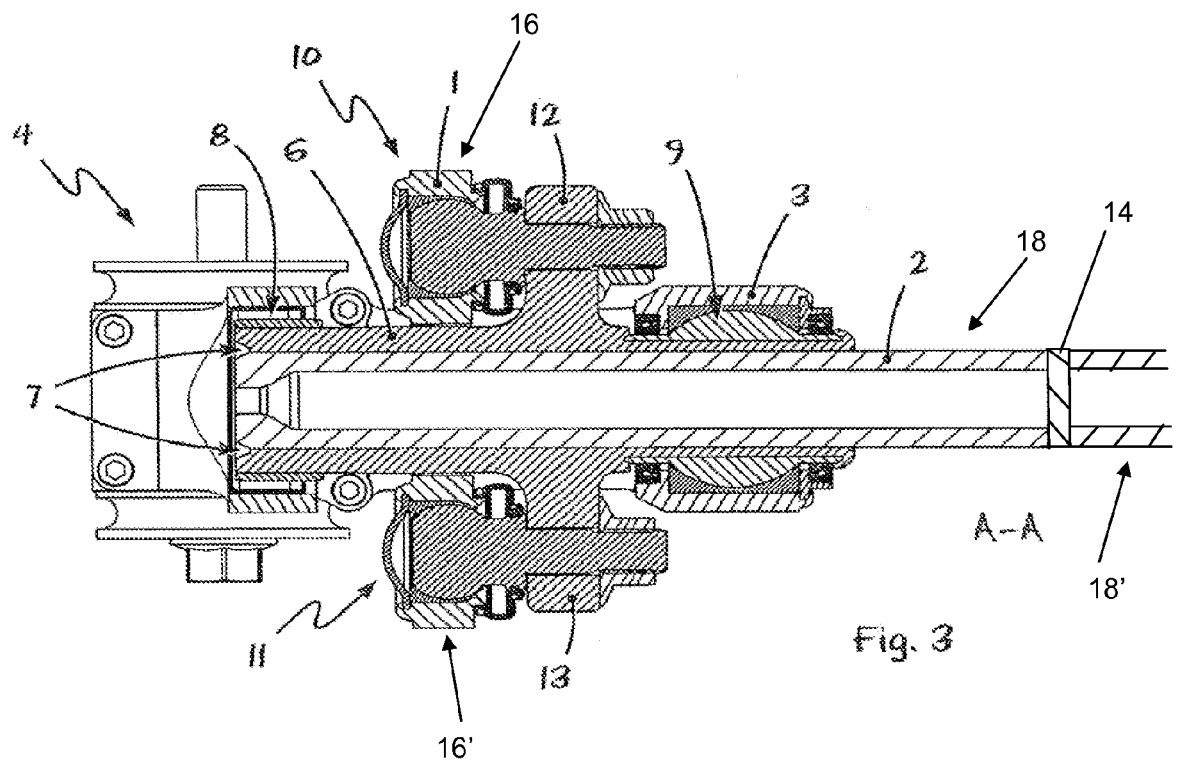
FIG. 3 is a vertical sectional view of the connection between the wheel guide control arm and the stabilizer end according to FIG. 1.

FIG. 1 shows, especially when viewed together with FIG. 3, the vehicle-related left-side end area of the roll stabilizer 2 of the vehicle, which is designed as a tubular stabilizer here, as well as the chassis-side end area of a wheel guide control arm 1, which is likewise shown only partially, and which is a tension rod of the wheel suspension of the left front wheel of a motor vehicle. The roll stabilizer 2 comprises two separate stabilizer halves 18, 18'. An actuator 14 is arranged between the stabilizer halves 18, 18'.

The end of the roll stabilizer 1 shown in FIGS. 1 and 3 is received in a bearing flange 3, which is connected via two support points 4, 5 to the chassis of the vehicle or to an axle carrier of the vehicle, not shown. The bearing flange 3 is, in the sense of lightweight construction, in the form of a one-piece component made of diecast light metal and carries at 4 and 6 each a bearing point designed as an elastomer bearing or hydraulic bearing for connection to the chassis of the vehicle or to the axle carrier of the vehicle.

While the entire arrangement comprising the roll stabilizer 2 and the wheel guide control arm 1 is thus uncoupled from the chassis of the vehicle in respect to vibrations by means of the elastomer bearings 4, 5, immediate response of the roll stabilizer 2 is guaranteed at the same time because of the non-elastic connection between the wheel guide control arm 1 and the roll stabilizer, which will be described in more detail below. It is possible now, in particular, to adjust the elastomer bearings 4, 5 as soft bearings in the x-y plane, i.e., in the plane of the drawing according to FIG. 1, in the sense of a comfort mounting, because it is above all in this plane that the undesired vibrations and sound transmissions take place starting from the wheel carrier (not shown) and are transmitted primarily in the longitudinal direction of the wheel guide control arm 1. At the same time, the elastomer bearings 4, 5 can, however, be adjusted to be several times harder in the z direction, i.e., along the vertical axis of the vehicle, than in the x-y plane, practically without loss of comfort, in order to thus guarantee an especially immediate response of the roll stabilizer 2 during inward deflection motions of the wheel.

The mounting of the stabilizer end 2 appears especially clearly from the sectional view according to FIG. 3, which is rotated by 90° in relation to the longitudinal axis of the roll stabilizer 2 compared to the view in FIG. 1. The direction of view in FIG. 3 is thus horizontal in the direction of travel of the motor vehicle. It can be recognized from the sectional view in FIG. 3 that the end of the roll stabilizer 2, which is of a hollow tubular design, is received in its turn in a hollow shaft 6. The connection between the hollow shaft 6 and the stabilizer end 2, which ensures rotation in unison, is carried out in the exemplary embodiment being shown in the form of a ring-shaped weld seam 7, which is arranged at the outermost end of the stabilizer 2 and which connects the stabilizer end 2 and the hollow shaft end 6 to one another.

This means that the entire length of the roll stabilizer 2 is uniformly available for the intended twisting deformation of the stabilizer 2. This makes possible the optimal design of the roll stabilizer 2, as a result of which a linear response characteristic of the stabilizer 2 with the intended torsional rigidity can be embodied while the stabilizer has at the same time the lowest weight possible.

The hollow shaft 6 and hence also the roll stabilizer 2 are mounted in relation to the bearing flange 3 in the exemplary embodiment in the form of a fixed and loose bearing, in which a needle bearing 8, which is the left-side needle bearing in relation to the drawing, is combined as a loose bearing with a fixed bearing 9, which is arranged on the right side relative to the drawing. The fixed bearing is designed in the form of a sleeve joint 9, as a result of which it is possible to readily absorb especially alignment errors or shaft deflections of the stabilizer 2, which occur, for example, as a consequence of dynamic forces of the wheel.

The connection between the hollow shaft 6 and the chassis-side end of the wheel guide control arm 1 or the tension rod 1 of the wheel suspension, which tension rod is formed by the wheel guide control arm, is carried out in the exemplary embodiment being shown, as this appears especially from FIG. 3, by means of two ball and socket joints 10, 11. The ball heads of the two ball and socket joints 10, 11 are connected here to two fastening projections 12, 13, which are made integrally with the hollow shaft 6 and are located opposite each other, while the joint housings 16, 16' of the two ball and socket joints 10, 11 are arranged in the chassis-side end of the wheel guide control arm or tension rod 1, which end has a fork-shaped design, or they are formed by the end of the tension rod 1 itself.

Figure 2:
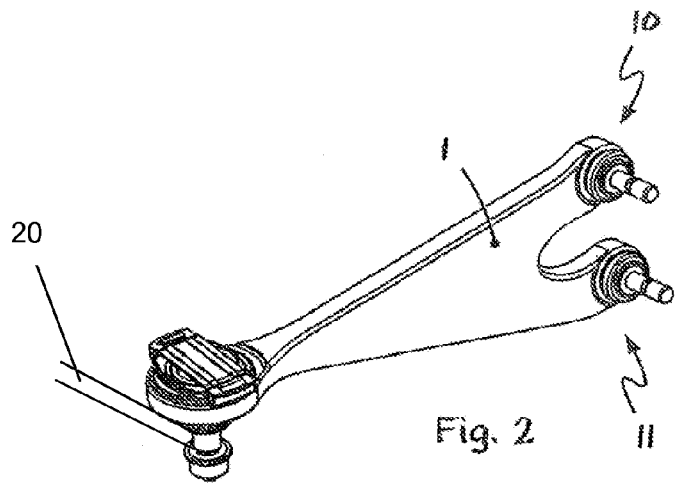
FIG. 2 is an isometric view of a schematic example of a wheel guide control arm for a stabilizer device according to the present invention.

The latter also appears schematically as an example from the view in FIG. 2, which shows a chassis-side end of a tension 1, which end has a correspondingly fork-shaped design, with the ball and socket joints 10, 11 arranged in the two fork ends.

The arrangement according to the present invention, comprising a straight stabilizer or stabilizer end 2, a hollow shaft 6 and a bearing flange 3, makes it possible, in particular, as is apparent from a comparison of FIGS. 1 and 3, a functional separation along the axial direction of the stabilizer 2 between the different tasks of "stabilizer mounting," "introduction of force" from the wheel guide control arm 1 into the stabilizer 2, as well as "connection" of the stabilizer device to the chassis and to the axle carrier. Not only does this lead to an extremely assembly-friendly design of the stabilizer device, which is robust in operation, but a considerable amount of installation space is also saved compared to other solutions proposed in the state of the art. In addition, the stabilizer device shown can be arranged on the vehicle chassis in a simple manner as a complete, preassembled unit, and an advantageous tolerance-insensitive mounting is also ensured at the same time because the entire arrangement is connected via the elastomer bearings 4, 5 only.

Thus, it becomes clear as a result that as a consequence of the present invention, a stabilizer device is provided, which entails substantial advantages compared to the state of the art concerning comfort properties and the uncoupling of the chassis from structure-borne noise while an immediate response of the stabilizer is maintained. Moreover, considerable improvements are achieved compared to the state of the art concerning the space needed for installation as well as concerning the modularity of the design and mounting.

Thus, the present invention makes a substantial contribution to design improvement as well as in respect to simplifications in the mounting of wheel-guiding stabilizer device, especially for use in axle systems subject to very high requirements in terms of vehicle dynamics.

While a specific embodiment of the invention has been shown and described in detail to illustrate the application of the principles of the invention, it will be understood that the invention may be embodied otherwise without departing from such principles.

The invention claimed is:

1. A stabilizer device for an axle of a motor vehicle, the stabilizer device comprising:
    a roll stabilizer associated with said axle;
    a wheel guide control arm for each wheel, said wheel guide control arm having a chassis-side portion connected to an end area of said roll stabilizer such that twisting actuation of the roll stabilizer takes place due to an inward deflection motion of said wheel guide control arm;
    a chassis-side bearing flange connected to the vehicle; and
    a shaft connected to the wheel guide control arm, said shaft receiving an end of said roll stabilizer, said shaft being hollow at least in some areas to provide a hollow shaft, wherein said hollow shaft is mounted in said chassis-side bearing flange.

2. A stabilizer device in accordance with claim 1, wherein said connection of said bearing flange to the vehicle has a spring rate at least twice in a Z direction corresponding to a vertical axis of the vehicle than in a X direction corresponding to a longitudinal axis of the vehicle or in a Y direction corresponding to a transverse axis of the vehicle.

3. A stabilizer device in accordance with claim 1, wherein the connection of the bearing flange comprises elastomer bearings or hydraulic bearings.

4. A stabilizer device in accordance with claim 3, wherein said elastomer bearings or hydraulic bearings are arranged in a symmetrically distributed manner relative to the intersection of the longitudinal axes of said wheel guide control arm and said hollow shaft.

5. A stabilizer device in accordance with claim 1, wherein said roll stabilizer is formed essentially by a straight rod or by a straight tube.

6. A stabilizer device in accordance with claim 1, wherein said roll stabilizer comprises two separate stabilizer halves, and an actuator arranged between said stabilizer halves for twisting said stabilizer halves relative to each other.

7. A stabilizer device in accordance with claim 1, wherein said wheel guide control arm is connected to said hollow shaft by means of two ball and socket joints.

8. A stabilizer device in accordance with claim 7, wherein centers of balls of said ball and socket joints are arranged on a straight line, said straight line passing through a diameter of said balls.

9. A stabilizer device in accordance with claim 7, wherein said joint housings of said ball and socket joints are formed by a wheel guide control arm.

10. A stabilizer device in accordance with claim 1, wherein said hollow shaft is mounted in a bearing flange by means of a fixed and loose bearing.

11. A stabilizer device in accordance with claim 10, wherein said fixed bearing of said hollow shaft is formed by a sleeve joint.

12. A stabilizer device in accordance with claim 1, wherein said wheel guide control arm is a tension rod or strut of a wheel suspension.

13. A stabilizer device for an axle of a motor vehicle, the stabilizer device comprising:
    a roll stabilizer associated with said axle;
    a wheel guide control arm for each wheel, said wheel guide control arm having a chassis-side portion connected to an end area of said roll stabilizer for a twisting actuation of the roll stabilizer upon an inward deflection motion of said wheel guide control arm;
    a hollow shaft connected to said wheel guide control arm, an end of said roll stabilizer being received in said hollow shaft; and
    a chassis-side bearing flange connected to the vehicle, said hollow shaft being mounted in a chassis-side bearing flange.

14. A stabilizer device in accordance with claim 13, wherein said connection of said bearing flange to the vehicle has a spring rate at least twice in a Z direction corresponding to a vertical axis of the vehicle than in a X direction corresponding to a longitudinal axis of the vehicle or in a Y direction corresponding to a transverse axis of the vehicle.

15. A stabilizer device in accordance with claim 13, wherein the connection of the bearing flange comprises elastomer bearings or hydraulic bearings.

16. A stabilizer device in accordance with claim 15, wherein said elastomer bearings or hydraulic bearings are arranged in a symmetrically distributed manner relative to the intersection of the longitudinal axes of said wheel guide control arm and said hollow shaft.

17. A stabilizer device in accordance with claim 13, wherein said roll stabilizer is formed essentially by a straight rod or by a straight tube.

18. A stabilizer device in accordance with claim 13, wherein said roll stabilizer comprises two separate stabilizer halves, and an actuator arranged between said stabilizer halves for twisting said stabilizer halves relative to each other.

19. A stabilizer device in accordance with claim 13, wherein said wheel guide control arm is connected to said hollow shaft by means of two ball and socket joints.

20. A stabilizer device in accordance with claim 19, wherein centers of balls of said ball and socket joints are arranged on a straight line, said straight line passing through a diameter of said balls.

* * * * *